United States Patent
Khadiya

(10) Patent No.: US 8,438,838 B2
(45) Date of Patent: May 14, 2013

(54) FUEL-FIRED BURNER AND HEAT EXCHANGER SYSTEM FOR HEATING A NOX REDUCING AGENT SUPPLY TANK

(75) Inventor: Navin Khadiya, Columbus, IN (US)

(73) Assignee: Faurecia Emissions Control Technologies, Columbus, IN (US)

( * ) Notice: Subject to any disclaimer, the term of this patent is extended or adjusted under 35 U.S.C. 154(b) by 331 days.

(21) Appl. No.: 12/901,623

(22) Filed: Oct. 11, 2010

(65) Prior Publication Data

US 2012/0085080 A1    Apr. 12, 2012

(51) Int. Cl.
*F01N 3/00* (2006.01)

(52) U.S. Cl.
USPC ............... 60/286; 60/274; 60/295; 60/297; 60/298; 60/303

(58) Field of Classification Search ............ 60/274, 60/286, 295, 297, 298, 301, 303, 320
See application file for complete search history.

(56) References Cited

U.S. PATENT DOCUMENTS

| | | | |
|---|---|---|---|
| 6,301,879 B1 * | 10/2001 | Weisweiler et al. | 60/274 |
| 7,275,366 B2 * | 10/2007 | Powell et al. | 60/320 |
| 7,367,183 B2 | 5/2008 | Eberspach | |
| 7,776,280 B2 | 8/2010 | Telford | |
| 7,849,674 B2 * | 12/2010 | Masuda et al. | 60/286 |
| 7,874,147 B2 * | 1/2011 | Khadiya | 60/286 |
| 7,895,829 B2 * | 3/2011 | Suzuki et al. | 60/286 |
| 8,037,674 B2 * | 10/2011 | Kupe et al. | 60/286 |
| 8,122,710 B2 * | 2/2012 | Schmale et al. | 60/286 |
| 2008/0264042 A1 | 10/2008 | Khadiya | |

FOREIGN PATENT DOCUMENTS

| | | |
|---|---|---|
| DE | 102004048338 B4 | 4/2010 |
| EP | 1469173 | 10/2004 |
| EP | 1741887 | 1/2007 |
| EP | 2065578 A1 | 3/2009 |
| KR | 20070059641 | 6/2007 |
| WO | 2008006608 A1 | 1/2008 |
| WO | 2009033911 A1 | 3/2009 |

OTHER PUBLICATIONS

International Search Report dated May 1, 2012.

* cited by examiner

*Primary Examiner* — Binh Q Tran

(74) *Attorney, Agent, or Firm* — Carlson Gaskey & Olds

(57) ABSTRACT

A fuel-fired burner in a vehicle exhaust system is used to heat up a frozen NOx reducing agent supply tank within a predetermined target amount of time. A method and apparatus are used to identify when a supply of agent is below a predetermined temperature, and the fuel-fired burner is activated for a sufficient amount of time to raise a temperature of the agent to at least the predetermined temperature with the predetermined target amount of time.

10 Claims, 2 Drawing Sheets

FUEL-FIRED BURNER AND HEAT EXCHANGER SYSTEM FOR HEATING A NOX REDUCING AGENT SUPPLY TANK

TECHNICAL FIELD

The subject invention relates to a vehicle exhaust system, and more specifically to an exhaust system with a fuel-fired burner that can be used to quickly heat up a frozen NOx reducing agent supply tank.

BACKGROUND OF THE INVENTION

Exhaust systems incorporate various components that are used to reduce pollutants in exhaust gases generated by an internal combustion engine. For example, the vehicle exhaust system is configured to remove NOx, i.e. oxides of nitrogen, from engine exhaust gases. In one known configuration, a selective catalytic reduction catalyst (SCR) is used to cause a reaction between NOx in the exhaust gas and a NOx reducing agent, such as ammonia for example. Ammonia is produced from urea by hydrolysis. To supply ammonia for this purpose, the exhaust system includes a supply of aqueous urea that is typically held within a tank.

In cold climate regions, the urea can become frozen within the tank. Certain regulations require that the urea be thawed within a predetermined amount of time. One known solution is to use an electrical heater for thawing purposes; however, this type of system has a high electrical power consumption, which is disadvantageous. Another known system uses engine coolant to heat the frozen urea; however, this does not heat the urea quickly enough.

SUMMARY OF THE INVENTION

A fuel-fired burner in a vehicle exhaust system is used to quickly heat up a frozen NOx reducing agent supply tank.

In one example, a method and apparatus are configured to identify when a supply of agent is below a predetermined temperature, and the fuel-fired burner is activated for a sufficient amount of time to raise a temperature of the agent to at least the predetermined temperature within the predetermined target amount of time.

In one example, the vehicle exhaust system includes a SCR catalyst and a NOx reducing agent supply system configured to provide a NOx reducing agent to the SCR catalyst. The NOx reducing agent supply system includes a tank that holds a supply of agent used to produce the NOx reducing agent. A heat exchanger is positioned downstream of the SCR catalyst and has a coolant outlet associated with the tank and a coolant inlet that receives a coolant. The fuel-fired burner is positioned upstream of the heat exchanger and is selectively actuated to heat exhaust gases such that a temperature of the agent within the tank can be raised to at least the predetermined temperature.

These and other features of the present invention can be best understood from the following specification and drawings, the following of which is a brief description.

DETAILED DESCRIPTION OF THE PREFERRED EMBODIMENT

Figure 1:
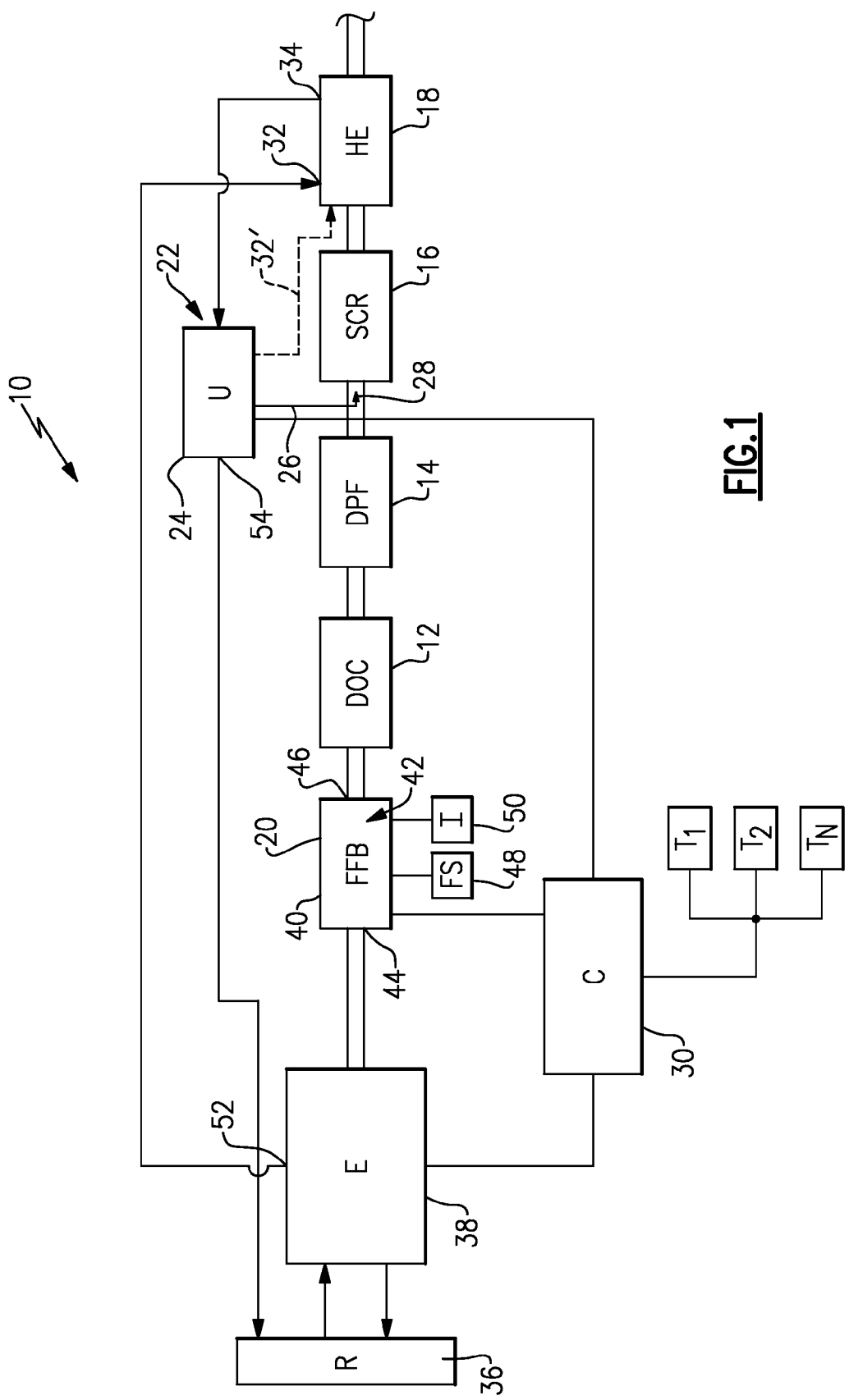
FIG. 1 shows a schematic view of a vehicle exhaust system incorporating the subject invention.

FIG. 1 shows a vehicle exhaust system 10 with a DOC (diesel oxidation catalyst) 12 and a DPF (diesel particulate filter) 14 that are located upstream of a SCR (selective catalytic reduction) catalyst 16 used to reduce NOx emissions. Optionally, the system 10 could include a catalyzed DPF with no DOC or the system 10 may not require a DOC or DPF. A heat exchanger 18 is located downstream of the SCR catalyst 16. A fuel-fired burner 20 is located upstream of the heat exchanger 18. In the example shown, the fuel-fired burner 20 is also located upstream of the DOC 12 and DPF 14 which is downstream of the DOC 12; however, the fuel-fired burner 20 could also be located at other positions within the exhaust system 10.

A NOx reducing agent supply system 22 includes a supply of agent held within a tank 24. The agent is configured to provide a NOx reducing agent that reacts within the SCR catalyst 16 to reduce NOx emissions as known. The agent can comprise a diesel exhaust fluid, a urea based liquid, a solid source of ammonia for SCR, or other similar fluid or solid. In one example, the tank 24 holds a supply of urea (mixture of water and urea to provide a desired concentration of urea) that is used to produce ammonia by hydrolysis as known. A supply line 26 fluidly connects the tank 24 to the exhaust system 10. In one example a nozzle or spray head 28 injects the NOx reducing agent at a location upstream of the SCR catalyst 16.

In certain cold climate areas, the agent held within the tank 24 can become frozen. Certain regulations require that the agent be thawed within a predetermined amount of time. The fuel-fired burner 20 is selectively actuated by a electronic control unit (ECU) or controller 30 to raise the temperature of exhaust gases such that the agent held within the tank 24 can be thawed/melted within a desired target time period. Heated exhaust gases generated by the fuel-fired burner 20 are communicated to the heat exchanger 18. The heat exchanger 18 has a coolant inlet 32 that receives a supply of coolant and a coolant outlet 34 that is associated with the tank 24. The heated exhaust gases raise the temperature of the coolant which then flows through the tank 24 to heat the agent. In one example, the coolant inlet 32 receives coolant from a coolant outlet 52 of an engine 38 and the tank 24 includes an outlet 54 that returns the coolant to a radiator 36 via a thermostat. Optionally, a reverse configuration could be used where the heat exchanger could receive coolant directly from the radiator 36, while the tank outlet 54 would be fed to the engine coolant inlet. Another option includes providing a dedicated cooling circuit that would be only between the tank 24 and the heat exchanger 18 as indicated at 32'.

Figure 2:
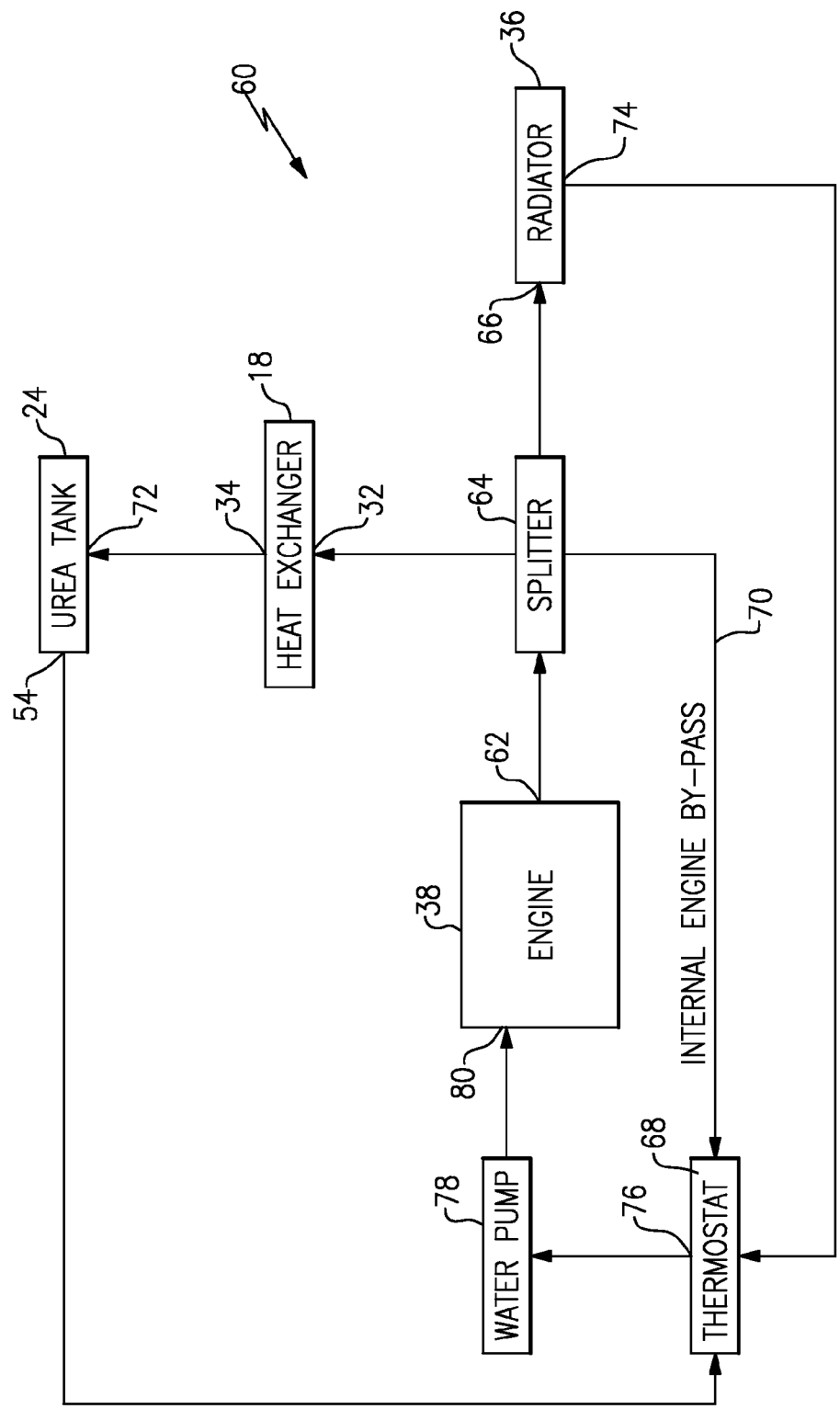
FIG. 2 shows a schematic view of one example of a coolant circuit for an engine.

A more detailed example of a coolant circuit 60 is shown in FIG. 2. In this example, the engine 38 includes a coolant outlet 62 that is fluidly connected to a splitter 64. The splitter 64 is configured to direct coolant to a radiator inlet 66, the heat exchanger inlet 32, or to a thermostat 68 via an internal engine by-pass 70. The outlet 34 from the heat exchanger 18 is fluidly connected to an inlet 72 of the tank 24, and the outlet 54 from the tank 24 is fluidly connected to the thermostat 68. A coolant outlet 74 of the radiator 36 is also fluidly connected to the thermostat 68. The thermostat 68 has an outlet 76 to a water pump 78 which is fluidly connected to a coolant inlet 80 to the engine 38.

The fuel-fired burner 20 could comprise, for example, a THERMAL REGENERATOR™ or THERMAL ENHANCER™ that is manufactured and sold by FAURECIA EMISSIONS CONTROL TECHNOLOGIES. The THERMAL ENHANCER™ is a partial range fuel-fired burner that elevates the exhaust temperature of exhaust gas to assist with regeneration of the DPF. The THERMAL REGENERATOR™ is a full range fuel-fired burner that enables DPF regeneration of a DPF as well as providing exhaust thermal management under various operating conditions. When the fuel-fired burner 16 is a partial range burner or a full range burner, it is controlled to additionally raise the temperature of the agent held within the tank 24 as needed.

The heat exchanger 18 could comprise, for example, an Exhaust Heat Recovery System (EHRS) that is manufactured and sold by FAURECIA EMISSIONS CONTROL TECHNOLOGIES. Other types of heat exchangers could also be used.

The fuel-fired burner 20 includes a housing 40 defining a combustion chamber 42. The housing 40 includes an exhaust gas inlet 44 and an exhaust gas outlet 46. Exhaust gases generated from the engine 38 flow through any upstream exhaust components to the exhaust gas inlet 44. Exhaust gases flow through the fuel-fired burner 20 to the exhaust gas outlet 46 and then on to any downstream exhaust system components.

The fuel-fired burner 20 includes an air/fuel supply system 48 that is selectively activated to inject/spray a mixture of air and fuel into the combustion chamber 42. The mixture is sprayed into existing exhaust gases within the combustion chamber 42 and an igniter 50 then ignites the fuel to increase heat. In one example, the igniter 50 comprises one or more electrodes, however, other types of igniters could also be used. Further, an airless fuel supply could also be used where only fuel would be injected/sprayed and then ignited.

The fuel-fired burner 20 is selectively activated by the controller 30 to elevate the exhaust temperature of exhaust gas to raise the temperature of the agent held within the tank 24 as needed. The controller 30 includes a control strategy for the fuel-fired burner 16, which considers various factors to activate the fuel-fired burner 20 at the appropriate level and for a sufficient amount of time to thaw the agent held within the tank 24.

The controller 30 includes various electronic components that cooperate to provide a electronic control unit to control an electromechanical system. For example, the controller 30 may include, amongst other electronic components typically included in such units, a processor and a memory device. The processor can comprise one or more microprocessors or microcontrollers, for example. The memory device can comprise a programmable read-only memory device (PROM) including erasable PROM's (EPROM, EEPROM), for example. The memory device is provided to store instructions in the form of one or more software routines and/or algorithms, which when executed by the processor, allow the controller 30 to control operation of the fuel-fired burner 16 using a specific control strategy.

One or more temperature sensors T1-Tn are used to communicate temperature data to the controller 30. At least one temperature sensor measures/monitors a temperature of the tank 24 and/or a temperature of the agent held within the tank 24. Other temperature sensors can be used to measure/monitor temperatures of the DOC, DPF, SCR catalyst, and/or heat exchanger as required. During a cold start, the fuel-fired burner 20 is typically actuated to quickly heat up various exhaust components to desired operating temperatures. Before deactivating the fuel-fired burner, the controller 30 will first determine whether or not the agent held within the tank 24 is still below a predetermined temperature, e.g. a melting temperature of the agent. If the temperature is still below the predetermined temperature, the controller 30 will maintain the fuel-fired burner 20 in an active mode.

In one example method, the current temperature of the agent/and or tank 24 would be measured with a temperature sensor and would be communicated to the controller 30. The controller 30 would determine an amount of energy required for the frozen agent to thaw within a target time. The controller 30 would also determine a rate in real time at which energy can be fed into the tank 24. The controller 30 is configured to determine factors such as exhaust gas flow rate, a maximum exhaust temperature that could possibly be provided by the heat exchanger 18, a maximum coolant flow possible with the heat exchanger 18, and a maximum possible heat exchanger efficiency.

The controller 30 generates a control signal to operate the fuel-fired burner 20 at a power level to feed energy to the tank 24 using the actual exhaust flow rate, the exhaust temperature at the heat exchanger 18, coolant flow rate, and maximum heat exchanger efficiency, for example. The controller repeatedly goes through these steps until the temperature is greater than a melting point of the agent. For example, if the agent comprises urea, the controller 30 operates the fuel-fired burner 20 until a temperature of at least −11 degrees C. is reached.

Further, the controller 30 is configured to ensure that the energy level that the fuel-fired burner is being operated at for increasing the agent temperature is at least as high as the temperature that is needed for SCR catalyst heating or any other emission control function. Engine coolant rate can also be actively controlled to maximize heat transfer to the tank 24.

Using a fuel-fired burner 20 to heat up a tank 24 for a NOx reducing agent supply system is a very cost effective way to quickly heat the tank. Further, this is accomplished without consuming large amounts of additional electrical power.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle exhaust system comprising:
a SCR catalyst;
a NOx reducing agent supply system configured to provide a NOx reducing agent to said SCR catalyst, said NOx reducing agent supply system including a tank that holds a supply of agent used to produce the NOx reducing agent;
a heat exchanger having a coolant outlet associated with said tank and a coolant inlet receiving a coolant;
a fuel-fired burner positioned upstream of said heat exchanger that is selectively actuated to heat exhaust gases such that a temperature of the agent within said tank can be raised to at least a predetermined temperature; and
at least one temperature sensor that measures a temperature of at least one of the tank and the agent and communicates the temperature to an electronic control unit, said electronic control unit activating said fuel-fired burner if said temperature falls below a pre-determined temperature.

2. The vehicle exhaust system according to claim 1 wherein said coolant inlet is fluidly connected to receive coolant from a coolant source and wherein said tank includes a tank outlet that is fluidly connected to return the coolant to the coolant source.

3. The vehicle exhaust system according to claim 1 wherein said heat exchanger is positioned downstream of said SCR catalyst and including a diesel oxidation catalyst that is positioned upstream of said SCR catalyst.

4. The vehicle exhaust system according to claim 3 including a diesel particulate filter downstream of said diesel oxidation catalyst and upstream of said SCR catalyst.

5. The vehicle exhaust system according to claim 1 wherein said coolant inlet is associated with said tank such that a coolant circuit is only between said heat exchanger and said tank.

6. A vehicle exhaust system comprising:
a SCR catalyst;
a NOx reducing agent supply system configured to provide a NOx reducing agent to said SCR catalyst, said NOx reducing agent supply system including a tank that holds a supply of agent used to produce the NOx reducing agent;
a heat exchanger having a coolant outlet associated with said tank and a coolant inlet receiving a coolant;
a fuel-fired burner positioned upstream of said heat exchanger that is selectively actuated to heat exhaust gases such that a temperature of the agent within said tank can be raised to at least a predetermined temperature; and
an electronic control unit that is configured to identify when the agent is below a predetermined temperature, and wherein said electronic control unit determines an amount of energy required raise a temperature of said agent to said predetermined temperature within a target time period, and wherein said electronic control unit generates a control signal to activate said fuel-fired burner at a power level to produce said amount of energy.

7. The vehicle exhaust system according to claim 6 wherein said electronic control unit is configured to determine a maximum exhaust gas temperature, a maximum coolant flow, and a maximum efficiency that are achievable by said heat exchanger, and wherein said electronic control unit determines a rate at which energy can be transferred to said tank based on exhaust gas flow rate, said maximum exhaust gas temperature, said maximum coolant flow, and said maximum efficiency, and wherein said electronic control unit controls said fuel-fired burner based on said rate.

8. The vehicle exhaust system according to claim 1 wherein the agent comprises one of a fluid or solid.

9. The vehicle exhaust system according to claim 8 wherein said fluid comprises one of a diesel exhaust fluid or urea based fluid.

10. The vehicle exhaust system according to claim 1 wherein said predetermined temperature comprises a melting temperature of said agent or a temperature at which ammonia may be released.

* * * * *